Sept. 8, 1970            P. W. HARLAND            3,527,102

PLASTIC CASE CONSTRUCTION WITH TIGHT SEAL AND BLOWOUT

Filed Dec. 19, 1968

INVENTOR
PHILIP W. HARLAND
BY
Smythe & Moore
ATTORNEYS

United States Patent Office 3,527,102
Patented Sept. 8, 1970

3,527,102
PLASTIC CASE CONSTRUCTION WITH TIGHT SEAL AND BLOWOUT
Philip W. Harland, Sellersville, Pa., assignor to Ametek, Inc., New York, N.Y., a corporation of Delaware
Filed Dec. 19, 1968, Ser. No. 785,308
Int. Cl. G01l 19/14
U.S. Cl. 73—431                                  4 Claims

ABSTRACT OF THE DISCLOSURE

An instrument casing is formed by a plastic back plate having an annular groove snapped into an internal annular rib on the cylindrical side wall of a cover. A resilient annular skirt is integrally formed on the back plate and the other end engages the inner face of the cover side wall. In its unflexed position, the skirt end is of a greater diameter than the inner diameter of the cover side wall so that when assembled this skirt end exerts a force against the cover side wall. When a predetermined pressure within the casing is exceeded, this pressure will bleed past the resilient skirt and towards the rear of the assembly.

---

Instruments for indicating, measuring or recording physical conditions, such as pressure and temperature, generally comprise a casing in which there is mounted an instrument movement responsive to a condition being measured and an indicator which moves over a scale in response to the condition as sensed by the movement. Many forms of casing construction have been proposed since it is desired to construct a casing having a minimum of components but which can be readily assembled and will function as a secure housing for the instrument. In pressure measuring instruments, the instrument movement may comprise a Bourdon tube which is susceptible to leakage, particularly over long periods of use. Also, an overpressure may damage the tubes. When such a leakage occurs, pressure will build up within the casing to such an extent that the pressure will eventually force its way past a seal between the casing components or any other weak element of the casing. Once this has occurred, the instrument generally is no longer reliable and must be discarded. To provide such an instrument casing with a check valve construction which would effectively seal the interior of the casing against outside pressures but which would permit the bleeding of a predetermined pressure within the casing has involved a complicated and expensive structure.

One of the objects of the present invention is to provide an improved instrument casing which is water or fluid tight but which permits the bleeding of an excessive pressure therein.

Another of the objects of the present invention is to provide a two-piece instrument casing with a water tight seal between the elements and a pressure relief for the casing.

In one aspect of the invention, an instrument casing may comprise a cover having a cylindrical side wall. A back plate is positioned within the end of the cylindrical side wall and is provided with a central bore or other bore which forms a passage from the interior of the casing defined by the cover and back plate. An instrument movement is mounted within the casing on the back plate in communication with the bore. Cooperating means are provided on the cover and back plate for retaining the cover and back plate in assembled positions. The back plate is provided with resilient means which engages the cover and bleeds pressure from within the casing when a predetermined pressure within the casing is exceeded.

Other objects, advantages and features of the present invention will be apparent from the accompanying description and drawings, which are merely exemplary.

Figure 1:
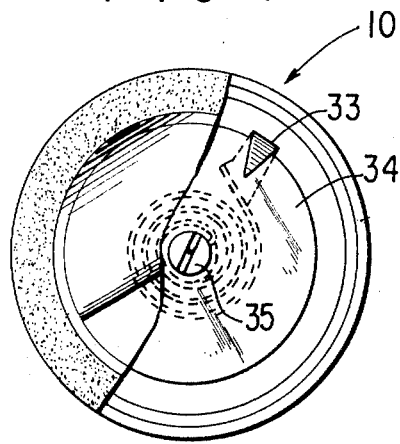
Figure 2:
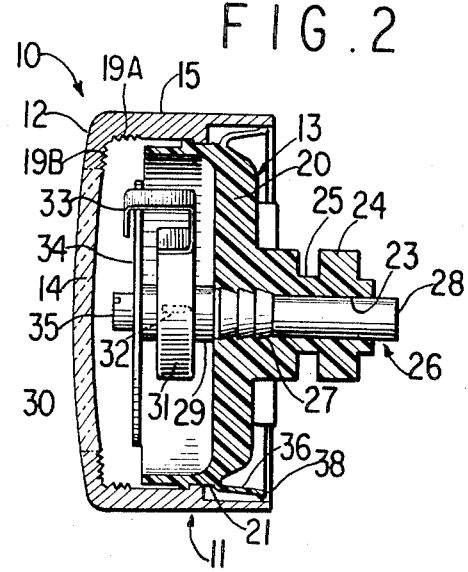
Figure 3:
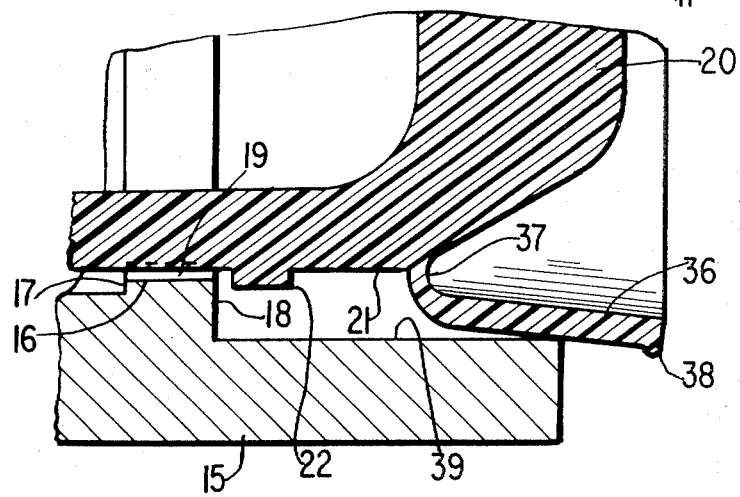
Figure 4:
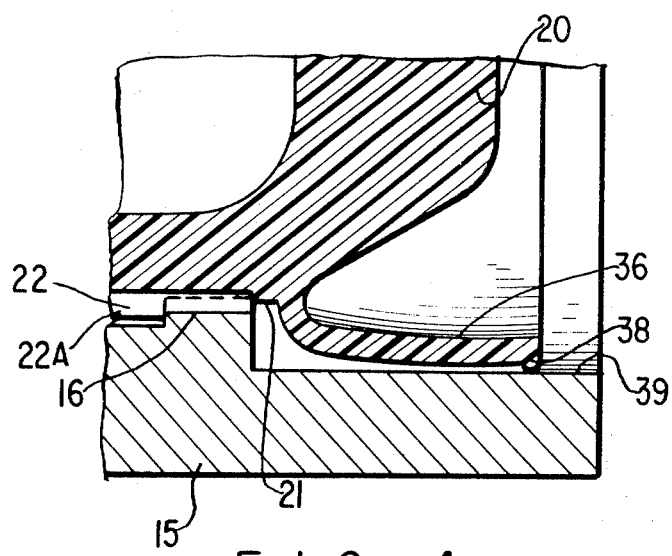

In the drawings:
FIG. 1 is a front elevational view of an instrument casing assembly according to the present invention with a portion of the cover being removed;
FIG. 2 is a longitudinal sectional view of the instrument casing assembly of FIG. 1;
FIG. 3 is a fragmentary view of FIG. 2 in enlarged scale showing the back plate and cover during disassembly;
FIG. 4 is a view similar to that of FIG. 3 but showing the back plate and cover in assembled position.

An instrument casing assembly is indicated at 10 (FIGS. 1, 2). A two-piece casing 11 is formed by a cover 12 and a back plate 13. Cover 12 has a transparent end wall 14 and extending therefrom is a cylindrical side wall 15 which may be provided with a suitable finish rendering the side wall translucent.

Within the cover side wall 15 there is provided an internal annular rib 16 which forms shoulders 17 and 18. The rib 16 may be discontinuous or broken, as at 19. The cover may be formed of a clear butyrate plastic or other suitable plastic. The cover plate may have a plurality of annular grooves 19A, 19B therein.

Back plate 13 is provided with an end wall 20 and the outer periphery of this end wall has formed therein an annular groove 21 confined by an annular external rib 22. In the form shown there is a central bore 23 through the back plate 13 and a cylindrical boss 24 having an annular groove 25.

Various means can be used to mount the movement. In the embodiment shown there is a metallic tubular socket 26 which may be provided with a plurality of annular serrations 27 for tightly gripping the inner face of the bore 23 and providing a tight fit. A firm gripping relationship is established since the back plate 13 is formed of a plastic such as polypropylene. The socket is provided with an outer end 28 which projects outwardly of the back plate boss and an inner end 29 upon which is mounted an instrument movement indicated generally at 30. The instrument movement may comprise a Bourdon tube 31 whose end communicates with the socket through a slot 32. The other end of the Bourdon tube is provided with a pointer 33 which moves over a scale on the face of a dial 34. The dial is secured to the tubular socket on post 35.

In order to form a watertight casing when the cover and back plate are assembled, the back plate is provided with a resilient annular flared skirt 36 integrally formed on the outer periphery of the back plate at 37 and projecting rearwardly therefrom, as at 38. The skirt 36 is so dimensioned that in its unflexed position, as shown in FIG. 3, the outer diameter of end 38 will be greater than the inner diameter of the surface 39 of the cover.

In the assembly of the cover and back plate the rib 22 on the latter is snapped over the cover rib 16 so that the rib 16 is seated in the annular groove 21 as shown in FIG. 4 and provides a tight seal to the interior of the casing. However, should a leakage occur within the instrument casing and there is a build up of pressure therein, excessive pressure may bleed past the skirt 36 by forcing the edge 38 inwardly. It will be apparent that the pressure at which bleeding or relief occurs from within the casing can be varied by proportioning the skirt 36.

To facilitate snapping of the rib 22 over the internal rib 16 a plurality of notches 22A may be formed in this lip.

The good moldability and inherent flexibility of polypropylene make this material a good selection for the base plate. However, other materials having similar resilient properties may also be employed for constructing the base plate. By properly adjusting the dimensions of the skirt a pressure relief will be provided for the instrument casing. In effect, the skirt acts as a check valve in that the pressure can flow from the internal casing to the atmosphere but prevents the flow of pressure from the atmosphere to the interior of the casing.

In will be understood that various details of construction and arrangement of parts may be made without departing from the spirit of the invention except as defined in the appended claims.

What is claimed is:

1. In an instrument casing assembly, a cover having a cylindrical side wall with an inner face, a back plate within the end of said cylindrical side wall and having a bore therethrough to provide a passage from the interior of the casing defined by the cover and back plate, an instrument movement within said casing mounted on said back plate in communication with said bore, cooperating means on said cover and back plate for retaining said cover and back plate in assembled position, and flared annular skirt pressure relief means on and extending from said back plate and resiliently and internally engaging the inner face of said cover for allowing pressure from within the casing to escape when a predetermined pressure within the casing is exceeded.

2. In an instrument casing assembly as claimed in claim 1 with said retaining means comprising an annular groove in the periphery of said back plate inwardly of said flared skirt pressure relief means, and an annular rib on the inner face of said cover side wall received within said groove.

3. In an instrument casing assembly as claimed in claim 1 with said pressure relief means comprising an annular resilient skirt integrally formed on and projecting from said back plate and engaging the inner face of said cover cylindrical side wall.

4. In an instrument casing assembly as claimed in claim 3 with the free extended end of said skirt having a diameter greater than the inner diameter of said cover cylindrical side wall when in the unflexed position.

References Cited

UNITED STATES PATENTS

| | | |
|---|---|---|
| 2,571,893 | 10/1951 | Kendall. |
| 2,829,380 | 4/1958 | Wood. |
| 3,152,480 | 10/1964 | Hoff _____ 73—431 |
| 3,248,955 | 3/1966 | Templeton _____ 277—29 X |
| 3,298,557 | 1/1967 | Ingham _____ 220—82 X |
| 3,434,330 | 3/1969 | Ingham et al. _____ 73—431 X |

LOUIS R. PRINCE, Primary Examiner

D. M. YASICH, Assistant Examiner

U.S. Cl. X.R.

73—416